United States Patent Office 3,185,681
Patented May 25, 1965

3,185,681
5,10-SECO-5,19-CYCLO-STEROIDS OF THE ANDROSTANE AND PREGNANE SERIES
Lawrence H. Knox, Mexico City, Mexico, assignor to Syntex Corporation, Panama, Panama, a corporation of Panama
No Drawing. Filed June 11, 1963, Ser. No. 286,916
Claims priority, application Mexico, Dec. 21, 1962, 70,272
22 Claims. (Cl. 260—239.5)

This invention relates to novel cyclopentanopolyhydrophenanthrene derivatives and to processes for their preparation. More particularly, this invention relates to novel 5,10-seco-5,19-cyclo steroids of the androstane and pregnane series represented by the general formulas:

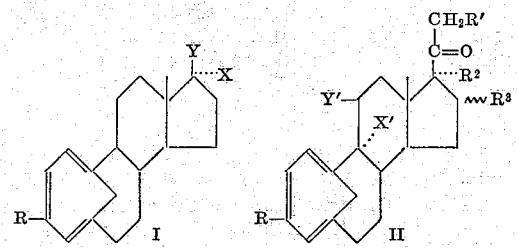

In these formulas, R represents the radical —OR⁴ or the radical

wherein $R^4$ represents a lower alkyl group, e.g., methyl, ethyl, propyl, butyl, and the like, or an acyl group containing up to 12 carbon atoms, $R^5$ represents a lower alkyl group, an aryl group, e.g., phenyl and the like, or an aralkyl group, e.g., benzyl and the like, $R^6$ represents hydrogen, a lower alkyl group, or an aryl or aralkyl group containing up to eight carbon atoms, and $R^5$ and $R^6$ taken together, along with the nitrogen atom to which they are attached, can also represent a heterocyclic radical such as piperidino, pyrrolidino, morpholino, piperazino, and the like; Y represents hydroxyl or an acyloxy group containing up to 12 carbon atoms; X represents hydrogen, a lower alkyl group, a lower alkenyl group, e.g., vinyl and the like, or a lower alkinyl group, e.g., ethinyl and the like, and X and Y taken together can represent a keto group; $R^1$ and $R^2$ each represent hydrogen, hydroxyl or an acyloxy group containing up to 12 carbon atoms, $R^3$ represents hydrogen, α-methyl, β-methyl or β-hydroxyl; $R^2$ and $R^3$ taken together represent the grouping:

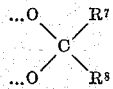

wherein $R^7$ represents hydrogen or a lower alkyl group and $R^8$ represents hydrogen, a lower alkyl group, an aryl group or an aralkyl group; $X^1$ represents hydrogen or a halogen, e.g., fluorine or chlorine, and $Y^1$ represents hydrogen, β-hydroxyl or a keto group, with $X^1$ and $Y^1$ being hydrogen when $R^1$ is hydrogen and $X^1$ being hydrogen when $Y^1$ is hydrogen.

The acyl and acyloxy groups referred to hereinabove are derived from hydrocarbon carboxylic acids containing less than 12 carbon atoms. These acids may be saturated or unsaturated, of straight, branched, cyclic or cyclic-aliphatic chain, or aromatic, and may be substituted by functional groups such as hydroxyl, alkoxy containing up to 5 carbon atoms, acyloxy containing up to 12 carbon atoms, nitro, amino, halogen, and the like. Typical ester groups are the acetate, trimethylacetate, t-butylacetate, phenoxyacetate, aminoacetate, propionate, cyclopentylpropionate, β-chloropropionate, enanthate and benzoate.

The compounds represented by Formula I hereinabove are anabolic agents having a favorable anabolic-androgenic ratio. They also exhibit anti-estrogenic and anti-gonadotropic activity, and lower blood cholesterol levels.

The compounds represented by Formula II wherein $R^1$ is hydrogen are progestational agents which inhibit ovulation and relieve premenstrual tension.

The compounds represented by Formula II wherein $R^1$ is other than hydrogen and $R^2$ is hydroxy are anti-inflammatory agents, useful in the treatment of rheumatism, arthritis, and inflammation of the skin, eyes, ears, and the like.

The novel 5,10-seco-5,19-cyclo steroids represented by Formulas I and II can be obtained by methods such as those illustrated by the following reaction sequences, wherein for the sake of clarity only rings A and B of the steroid molecule are shown:

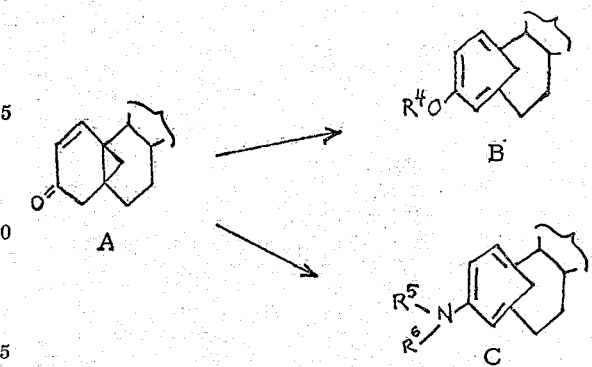

In these formulas $R^4$, $R^5$ and $R^6$ have the same meanings as set forth hereinabove for Formulas I and II.

The starting material (A), a 5,10-methylene-19-nor-Δ¹-3-keto steroid of the androstane or pregnane series, is obtained by reacting the corresponding 19-hydroxy-Δ⁴-3-keto steroid with an α-fluorinated amine as described in my copending U.S. patent application Serial No. 286,931, filed on June 11, 1963. An illustrative but by no means exhaustive listing of 5,10-methylene-19-nor-Δ¹-3-keto-androstene and -pregnene starting materials includes 5,10-methylene-19-nor-Δ¹-androstene-3,17-dione, 5,10-methylene-19-nor-Δ¹-androsten-17β-ol-3-one and its 17-esters,
5,10-methyl-17α-methyl-19-nor-Δ¹-androsten-17β-ol-3-one,
5,10-methylene-17α-vinyl-19-nor-Δ¹-androsten-17β-ol-3-one,
5,10-methylene-17α-ethinyl-19-nor-Δ¹-androsten-17β-ol-3-one,
5,10-methylene-19-nor-Δ¹-pregnene-3,20-dione,
5,10-methylene-19-nor-Δ¹-pregnen-17α-ol-3,20-dione and its 17-esters,
Δ⁵,¹⁰-methylene-19-nor-Δ¹-pregnen-21-ol-3,20-dione,
5,10-methylene-19-nor-Δ¹-pregnene-17α,21-diol-3,20-dione,
5,10-methylene-19-nor-Δ¹-pregnene-17α,21-diol-3,11,20-trione,
5,10-methylene-19-nor-Δ¹-pregnene-11β,17α,21-triol-3,20-dione,
5,10-methylene-16α-methyl-19-nor-Δ¹-pregnene-17α,21-diol-3,11,20-trione,
9α-fluoro-5,10-methylene-16α-methyl-19-nor-Δ¹-pregnene-11β,17α,21-triol-3,20-dione,
16α,17α-isopropylidenedioxy-5,10-methylene-19-nor-Δ¹-pregnene-11β,21-diol-3,20-dione, and the respective 21-monoesters of the aforementioned 21-hydroxy compounds.

Reaction of the 5,10-methylene-19-nor-Δ¹-3-keto-androstene or pregnene starting materials (A) with a primary or secondary alcohol containing up to 8 carbon atoms, e.g., methanol, ethanol, propanol, isoamyl alcohol, cyclopentanol, cyclohexanol, and the like, produces the corresponding 3-alkoxy-5,10-seco-5,19-cyclo-Δ¹⁽¹⁰⁾,²,⁴-androstatriene or pregnatriene (B; R⁴=lower alkyl). This reaction will generally be carried out at reflux temperature in the presence of an acid catalyst, such as p-toluenesulfonic acid, perchloric acid, sulfuric acid, and the like, for a period of time ranging from about 45 minutes to about 3 hours, and preferably for about 1 hour, with the primary or secondary alcohol reactant also serving as a solvent for the reaction.

Similarly, by reacting the 5,10-methylene-19-nor-Δ¹-3-keto-androstene or -pregnene starting material (A) with a hydrocarboxylic acid anhydride in the presence of an acidic catalyst, e.g., acetyl chloride, p-toluenesulfonic acid, or the like, preferably at a temperature ranging from room temperature (i.e., about 25° C.) to reflux temperature for from about 15 minutes to about 2 hours, the corresponding 3-acyloxy-5,10-seco-5,19-cyclo-Δ¹⁽¹⁰⁾,²,⁴-androstatriene or pregnatriene (B; R⁴=acyl) is obtained.

When carrying out this acylation reaction using starting materials which possess free primary or secondary hydroxyl groups, e.g., 5,10-methylene-19-nor-Δ¹-androsten-17β-ol-3-one or 5,10-methylene-19-nor-Δ¹-pregnen-21-ol-3,20-dione, the corresponding C-17 and/or C-21 esters are always obtained. In the case of the 17β-hydroxy androstane derivatives substituted by a lower alkyl, alkenyl or alkinyl radical at the 17α-position, or of corticoids which can be esterified at the 11- and/or 17-position, it is recommended that the acylation reaction be effected at room temperature for a short time in order to avoid esterification of the tertiary hydroxyl group at the 17-position and/or the hydroxyl group at the 11-position.

Reaction of the 5,10-methylene-9-nor-Δ¹-3-keto-androstene or pregnene starting materials (A) with an aliphatic, cyclic or cyclic-aliphatic primary or secondary amine, e.g., dimethylamine, diethylamine, methylethylamine, aniline, methylaniline, pyrrolidine, piperidine, morpholine, piperazine, and the like, produces the corresponding 3-amino-5,10-seco-5,19-cyclo-Δ¹⁽¹⁰⁾,²,⁴-androstatrienes and pregnatrienes (C). This reaction will be carried out in a solvent containing no active hydrogen, e.g., a hydrocarbon solvent such as benzene, toluene, xylene, and the like, and ether such as dioxane, diethyl ether, tetrahydrofuran, and the like, or a halogenated hydrocarbon such as methylene chloride and the like, as well as mixtures thereof, and in the presence of an acid catalyst, such as p-toluenesulfonic acid and the like, preferably at reflux temperature for a period of time ranging from about 60 minutes to about 4 hours.

The novel compounds of the present invention having free or esterified hydroxyl groups at various positions on the steroid molecule can be esterified or saponified by conventional procedures. Furthermore, the novel compounds of the present invention having no oxygen function at the 11-position can be microbiologically hydroxylated at this position by known methods, and the resulting 11-hydroxylated derivatives can then be oxidized to the corresponding 11-keto compounds or transformed into the corresponding 9α-halo-11-oxygenated derivatives by the method of Fried et al. [J. Am. Chem. Soc., vol. 75, p. 2273 (1953)].

Various physical measurements, including nuclear magnetic resonance data indicate that the novel compounds of the present invention predominantly have the 5,10-seco-5,19-cyclo structure indicated in the formulas presented hereinabove. However, various chemical reactions, e.g., hydrogenation, indicate that these compounds can also exist in equilibrium with their electron tautomers, as shown by the following partial structural formulas:

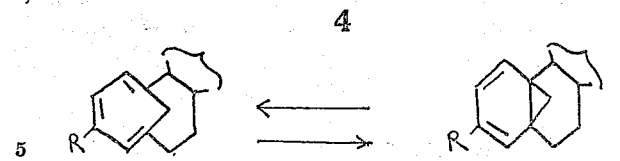

wherein R has the same meaning as set forth hereinabove for Formulas I and II. Thus, the mention of either of these tautomeric forms in the instant specification and claims is intended to include both tautomeric forms, it being understood that the specification and claims will in no way be defective should it later be shown that one or the other of these tautomeric forms, or some other tautomeric form or forms, predominates.

The following examples serve to illustrate the present invention but are not intended to limit its scope:

Example I

A mixture of 3 g. of 5,10-methylene-19-nor-Δ¹-androstene-3,17-dione, 250 cc. of methanol and 300 mg. of p-toluenesulfonic acid was heated at reflux temperature for 30 minutes. The mixture was cooled, diluted with water and extracted with ether. The extract was washed with sodium bicarbonate solution and water to neutral, dried over anhydrous sodium sulfate and evaporated to dryness. The residue was crystallized from methanol to give 3-methoxy - 5,10-seco-5,19-cyclo-Δ¹⁽¹⁰⁾,²,⁴-androstatrien-17-one which may be also designated as the tautomer 3-methoxy-5,10 - methylene-19-nor-Δ¹,³-androstadiene - 17 - one, M.P. 135–136° C.; $[\alpha]_D$ +246° (CHCl₃); λmax. 256–258 mμ log ε 3.76.

In a similar manner, starting from 5,10-methylene-19-nor-Δ¹-androsten-17β-ol-3-one there was obtained 3-methoxy-5,10-seco-5,19-cyclo-Δ¹⁽¹⁰⁾,²,⁴-androstatrien-17β-ol (3-methoxy - 5,10-methylene-19-nor-Δ¹,³-androstadien - 17β-ol).

Example II

A mixture 2.5 g. of 5,10-methylene-19-nor-Δ¹-androstene-3,17-dione, 400 cc. of benzene, 2.5 g. of pyrrolidine and 250 mg. of p-toluenesulfonic acid was refluxed for 1 hour, diluted with water, the organic layer was separated and washed with sodium bicarbonate solution and water to neutral, dried over anhydrous sodium sulfate and evaporated to dryness. Crystallization of the residue from methanol gave 3(N - pyrrolidyl)-5,10-seco-5,19-cyclo-Δ¹⁽¹⁰⁾,²,⁴-androstatrien-17-one (5,10-methylene 3(N-pyrrolidyl)-9-nor-Δ¹,³-androstadien-17-one), M.P. 203–205° C.

Example III

A mixture of 1 g. of 5,10-methylene-19-nor-Δ¹-androsten-17β-ol-3-one, 100 cc. of benzene, 1 g. of diethylamine and 100 mg. of p-toluenesulfonic acid was refluxed for 45 minutes cooled, washed to neutral and evaporated to dryness under vacuo. The residue was crystallized from methylene chloride-methanol, thus producing 3(N,N-diethylamino)-5,10-seco-5,19-cyclo-Δ¹⁽¹⁰⁾,²,⁴ - androstatrien-17β-ol (5,10-methylene-3(N,N - diethylamino) - 19 - nor-Δ¹,³-androstadien-17β-ol).

Example IV

In the method of the preceding example, diethylamine was substituted by dimethylamine, thus affording 3(N,N-dimethylaminol)-5,10-seco-5,19 - cyclo - Δ¹⁽¹⁰⁾,²,⁴ - androstatrien-17β-ol (5,10-methylene-3(N,N - dimethylamino)-19-nor-Δ¹,³-androstadien-17β-ol).

A mixture of 500 mg. of the foregoing compound, 4 cc. of pyridine and 4 cc. of acetic anhydride was kept at room temperature over night; it was poured into water and the formed precipitate filtered off, to give the acetate of 3(N,N-dimethylamino)-5,10-seco - 5,19 - cyclo - Δ¹⁽¹⁰⁾,²,⁴-androstatrien-17β-ol, (acetate of 5,10-methylene-3(N,N-dimethylamino)-19-nor-Δ¹,³-androstadien-17β-ol).

Example V

A solution of 5 g. of 5,10-methylene-19-nor-$\Delta^1$-androsten-17β-ol-3-one in 50 cc. of acetic anhydride and 5 cc. of acetyl chloride was refluxed for 15 minutes under nitrogen atmosphere. The reaction mixture was distilled almost to dryness, cooled, diluted with ether, and the organic extract washed with water, then with 5% sodium bicarbonate solution and finally with water, dried and evaporated to dryness. There was thus obtained 3,17-diacetoxy-5,10-seco-5,19-cyclo-$\Delta^{1(10)2,4}$-androstatriene-(3,17-diacetoxy-5,10-methylene-19-nor-$\Delta^{1,3}$-androstadiene).

By the same method the compounds below mentioned (I) were converted into (II).

| I | II |
|---|---|
| 5,10-methylene-19-nor-$\Delta^1$-pregnene-3,20-dione. | 3-acetoxy-5,10-seco-5,19-cyclo-$\Delta^{1(10),2,4}$-pregnatriene 20-one. (3-acetoxy-5,10-methylene-19-nor-$\Delta^{1,3}$-pregnadien-20-one.) |
| 5,10-methylene-17α-methyl-19-nor-$\Delta^1$-androsten-17β-ol-3-one. | 3-acetoxy-17α-methyl-5,10-seco-5,19-cyclo-$\Delta^{1(10),2,4}$-androstatrien-17β-ol. (3-acetoxy-5,10-methylene-17α-methyl-19-nor-$\Delta^{1,3}$-androstadien-17β-ol). |
| 5,10-methylen-17α-ethinyl-19-nor-$\Delta^1$-androsten-17β-ol-3-one. | 3-acetoxy-17α-ethinyl-5,10-seco-5,19-cyclo-$\Delta^{1(10),2,4}$-androstatrien-17β-ol. (3-acetoxy-5,10-methylen-17α-ethinyl-19-nor-$\Delta^{1,3}$-androstadien-17β-ol). |
| 5,10-methylene-16α-methyl-19-nor-$\Delta^1$-pregnene-3,20-dione. | 3-acetoxy-16α-methyl-5,10-seco-5,19-cyclo-$\Delta^{1(10),2,4}$-pregnatrien-20-one. (3-acetoxy-5,10-methylene-16α-methyl-19-nor-$\Delta^{1,3}$-pregnadien-20-one). |
| 5,10-methylene-19-nor-$\Delta^1$-pregnene-17α,21-diol-3,20-dione-21 acetate. | 3,21-diacetoxy-5,10-seco-5,19-cyclo-$\Delta^{1(10),2,4}$-pregnatrien-17α-ol-20-one. (3,21-diacetoxy-5,10-methylene-19-nor-$\Delta^{1,3}$-pregnadien-17α-ol-20-one). |
| 5,10-methylene-19-nor-$\Delta^1$-pregnen-17α-ol-3,20-dione. | 3-acetoxy-5,10-seco-5,19-cyclo-$\Delta^{1(10),2,4}$-pregnatrien-17α-ol-20-one. (3-acetoxy-5,10-methylene-19-nor-$\Delta^{1,3}$-pregnadien-17α-ol-20-one). |
| 5,10-methylene-19-nor-$\Delta^1$-pregnen-17α-ol-3,20-dione acetate. | 3,17-diacetoxy-5,10-seco-5,19-cyclo-$\Delta^{1(10),2,4}$-pregnatrien-20-one. (3,17-diacetoxy-5,10-methylene 19-nor-$\Delta^{1,3}$-pregnadien-20-one). |
| 5,10-methylene-16β-methyl-19-nor-$\Delta^1$-pregnene-3,20-dione. | 3-acetoxy-16β-methyl-5,10-seco-5,19-cyclo-$\Delta^{1(10),2,4}$-pregnatrien-20-one. (3-acetoxy-5,10-methylene-16β-methyl-19-nor-$\Delta^{1,3}$-pregnadien-20-one). |

Example VI

In the method of Example I, methanol was substituted by ethanol, isopropanol and isoamyl-alcohol, to produce, using 5,10-methylene-19-nor-$\Delta^1$-androsten-17β-ol-3-one as starting material, 3-ethoxy-5,10-seco-5,19-cyclo-$\Delta^{1(10),2,4}$-androstatrien-17β-ol (3-ethoxy-5,10-methylene-19-nor-$\Delta^{1,3}$-androstadien-17β-ol), 3-isopropoxy-5,10-seco-5,19-cyclo-$\Delta^{1(10),2,4}$-androstatrien-17β-ol, (3-isopropoxy-5,10-methylene-19-nor-$\Delta^{1,3}$-androstadien-17β-ol) and 3-isoamyloxy-5,10-seco-5,19-cyclo-$\Delta^{1(10),2,4}$-androstatrien-17β-ol-(3-isoamyloxy-5,10-methylene-19-nor-$\Delta^{1,3}$-androstadien-17β-ol).

Example VII

In accordance with the method described in Example I, 5,10-methylene-19-nor-$\Delta^1$-pregnene-3,20-dione and 5,10-methylene-19-nor-$\Delta^1$-pregnene-17α,21-diol-3,20-dione 21-acetate were converted into 3-methoxy-5,10-seco-5,19-cyclo-$\Delta^{1(10),2,4}$-pregnatrien-20-one (3-methoxy-5,10-methylene-19-nor-$\Delta^{1,3}$-pregnadien-20-one) and 3-methoxy-5,10-seco-5,19-cyclo-$\Delta^{1(10),2,4}$-pregnatrien-17α,21-diol-20-one 21-acetate (3-methoxy-5,10-methylene-19-nor-$\Delta^{1,3}$-pregnadien-17α,21-diol-20-one 21-acetate).

Example VIII

By following the method described in Example I, 2 g. of 5,10-methylene-19-nor-$\Delta^1$-pregnene-17α,21-diol-3,11,20-trione were converted into 3-methoxy-5,10-seco-5,19-cyclo-$\Delta^{1(10),2,4}$-pregnatriene-17α,21-diol-11,20-dione (3-methoxy-5,10-methylene-19-nor-$\Delta^{1,3}$-pregnadiene-17α,21-diol-11,20-dione) which was acetylated with acetic anhydride in pyridine in accordance with the method described in Example IV.

In the same manner, starting from 5,10-methylene-19-nor-$\Delta^1$-pregnene-11β,17α,21-triol-3,20-dione there were obtained 3-methoxy-5,10-seco-5,19-cyclo-$\Delta^{1(10),2,4}$-pregnatriene-11β,17α,21-triol-20-one (3-methoxy-5,10-methylene-19-nor-$\Delta^{1,3}$-pregnadiene-11β,17α,21-triol-20-one) and its 21-acetate.

Example IX

A mixture of 5 g. of 5,10-methylene-19-nor-$\Delta^1$-pregnene-3,20-dione, 75 cc. of cyclopentanol and 100 mg. of p-toluenesulfonic acid was refluxed for 1½ hours. It was then diluted with water and extracted with methylene chloride. The organic extract was washed with sodium carbonate solution and water to neutral, dried and evaporated to dryness. Crystallization of the residue from methylene chloride-methanol gave 3-cyclopentyloxy-5,10-seco-5,19-cyclo-$\Delta^{1(10),2,4}$-pregnatrien-20-one (3-cyclopentyloxy-5,10-methylene-19-nor-$\Delta^{1,3}$-pregnadiene-20-one).

In the same manner the acetate of 5,10-methylene-19-nor-$\Delta^1$-pregnene-17α-ol-3,20-dione and the acetate of 5,10-methylene-16α-methyl-19-nor-$\Delta^1$-pregnene-17α,21-diol-3,20-dione were converted respectively into the acetate of 3-cyclopentyloxy-5,10-seco-5,19-cyclo-$\Delta^{1(10),2,4}$-pregnatrien-17α-ol-20-one (the acetate of 3-cyclopentyloxy-5,10-methylene-19-nor-$\Delta^{1,3}$-pregnadien-17α-ol-20-one) and the 21-acetate of 3-cyclopentyloxy-16α-methyl-5,10-seco-5,19-cyclo-$\Delta^{1(10),2,4}$-pregnatrien-17α,21-diol-20-one (21-acetate of 3-cyclopentyloxy-5,10-methylene-16α-methyl-19-nor-$\Delta^{1,3}$-pregnadiene-17α,21-diol-20-one).

Example X

To a solution of 1 g. of 5,10-methylene-19-nor-$\Delta^1$-pregnene-3,20-dione in 75 cc. in ethanol there was added 0.5 cc. of 72% perchloric acid and the mixture was refluxed for 1 hour. It was then diluted with water, extracted with ether and the organic extract washed to neutral, dried and evaporated to dryness. The residue was crystallized from acetone-ether, thus affording 3-ethoxy-5,10-seco-5,19-cyclo-$\Delta^{1(10),2,4}$-pregnatrien-20-one (3-ethoxy-5,10-methylene-19-nor-$\Delta^{1,3}$-pregnadiene-20-one).

In the same manner 5,10-methylene-17α-methyl-19-nor-$\Delta^1$-androstene-17β-ol-3-one, 5,10-methylene-17α-vinyl-19-nor-$\Delta^1$-androsten-17β-ol-3-one and 5,10-methylene-17α-ethinyl-19-nor-$\Delta^1$-androsten-17β-ol-3-one were converted respectively into 3-ethoxy-17α-methyl-5,10-seco-5,19-cyclo-$\Delta^{1(10),2,4}$-androstatrien-17β-ol (3-ethoxy-5,10-methylene-17α-methyl-19-nor-$\Delta^{1,3}$-androstadien-17β-ol), 3-ethoxy-17α-vinyl-5,10-seco-5,19-cyclo-$\Delta^{1(10),2,4}$-androstatrien-17β-ol (3-ethoxy-5,10-methylene-17α-vinyl-19-nor-$\Delta^{1,3}$-androstadien-17β-ol) and 3-ethoxy-17α-ethinyl-5,10-seco-5,19-cyclo-$\Delta^{1(10),2,4}$-androstatrien-17β-ol (3-ethoxy-5,10-methylene-17α-ethinyl-19-nor-$\Delta^{1,3}$-androstadien-17β-ol).

Example XI

By following method described in Example III the compounds below mentioned (I) were treated with primary or secondary amines to produce the compounds listed under II.

| I | Reagent | II |
|---|---------|----|
| 5,10-methylene-19-nor-Δ¹-pregnene-3,20-dione. | Benzylamine. | 3 (N-benzylamino)-5,10-seco-5,19-cyclo-Δ¹(10),2,4-pregnatrien-20-one. (5,10-methylene-3(N-benzylamino)-19-nor-Δ¹,³-pregnadien-20-one). |
| 5,10-methylene-17α-methyl-19-nor-Δ¹-androsten-17β-ol-3-one. | Dimethylamine. | 3-(N,N-dimethylamino)-17α-methyl-5,10-seco-5,19-cyclo-Δ¹(10),2,4-androstatrien-17β-ol. (5,10-methylene-3(N,N-dimethylamino)-17α-methyl-19-nor-Δ¹,³-androstadien-17β-ol). |
| 5,10-methylene-17α-vinyl-19-nor-Δ¹-androsten-17β-ol-3-one. | Ethylamine. | 3(N-ethylamino)-17α-vinyl-5,10-seco-5,19-cyclo-Δ¹(10),2,4-androstatrien-17β-ol. (5,10-methylene-3-(N-ethylamino)-17α-vinyl-19-nor-Δ¹,³-androstadien-17β-ol). |
| 5,10-methylene-19-nor-Δ¹-pregnene-17α,21-diol-3,11,20-trione-21-acetate. | Methylaniline. | 3(N-methylanilino)-5,10-seco-5,19-cyclo-Δ¹(10),2,4-pregnatriene-17α,21-diol-11,20-dione 21-acetate. (5,10-methylene-3(N-methylanilino)-19-nor-Δ¹,³-pregnadiene-17α,21-diol-11,20-dione 21-acetate). |
| 5,10-methylene-16α-methyl-19-nor-Δ¹-pregnene-17α,21-diol-3,11,20-trione 21-acetate. | Diethylamine. | 3(N,N-diethylamino)-16α-methyl-5,10-seco-5,19-cyclo-Δ¹(10),2,4-pregnatriene-17α,21-diol-11,20-dione 21-acetate. (5,10-methylene-3-(N,N-diethylamino)-16α-methyl-19-nor-Δ¹,³-pregnadiene-17α,21-diol-11,20-dione 21-acetate). |
| 5,10-methylen-16α,17α-isopropylidenedioxy-19-nor-Δ¹-pregnen-21-ol-3,11,20-trione acetate. | Isoamylamine. | 3(N-isoamylamino)-16α,17α-isopropylidenedioxy-5,10-seco-5,19-cyclo-Δ¹(10),2,4-pregnatrien-21-ol-11,20-dione acetate. (5,10-methylene-3(N-isoamylamino)-16α,17α-isopropylidenedioxy-19-nor-Δ¹,³-pregnadien-21-ol-11,20-dione acetate). |
| 9α-fluoro-5,10-methylene-19-nor-Δ¹-pregnene-11β,17α,21-triol-3,20-dione 21-acetate. | Methylethylamine. | 3(N-methyl,N-ethylamino)-9α-fluoro-5,10-seco-5,19-cyclo-Δ¹(10),2,4-pregnatriene-11β,17α,21-triol-20-one 21-acetate. (9α-fluoro-5,10-methylene-3(N-methyl, N-ethylamino)-19-nor-Δ¹,³-pregnadiene-11β,17α,21-triol-20-one 21-acetate). |
| 9α-fluoro-5,10-methylene-16α-methyl-19-nor-Δ¹-pregnene-11β,17α,21-triol-3,20-dione 21-acetate. | Cyclopentylamine. | 3(N-cyclopentylamino)-9α-fluoro-16α,methyl-5,10-seco-5,19-cyclo-Δ¹(10),2,4-pregnatriene-11β,17α,21-triol-20-one 21-acetate. (9α-fluoro-5,10-methylene-3(N-cyclopentylamino)-16α-methyl-19-nor-Δ¹,³-pregnadiene-11β,17α,21-triol-20-one 21-acetate). |
| 9α-chloro-5,10-methylene-16α-methyl-19-nor-Δ¹-pregnene-17α,21-diol-3,11,20-trione 21-acetate. | Aniline. | 3(N-anilino)-9α-chloro-16α-methyl-5,10-seco-5,19-cyclo-Δ¹(10),2,4-pregnatriene-17α,21-diol-11,20-dione 21-acetate. (9α-chloro-5,10-methylene 3(N-anilino)-16α-methyl-19-nor-Δ¹,³-pregnadiene-17α,21-diol-11,20-dione 21-acetate). |
| 5,10-methylene-16β-methyl-19-nor-Δ¹-pregnene-3,20-dione. | Isobutylamine. | 3(N-isobutylamino)-16β-methyl-5,10-seco-5,19-cyclo-Δ¹(10),2,4-pregnatrien-20-one. (5,10-methylene-3(N-isobutylamino)-16β-methyl-19-nor-Δ¹,³-pregnadien-20-one). |
| 5,10-methylene-19-nor-Δ¹-pregnene-17α,21-diol-3,20-dione 21-acetate. | Diethylamine. | 3(N,N-diethylamino)-5,10-seco-5,19-cyclo-Δ¹(10),2,4-pregnatriene-17α,21-diol-20-one 21-acetate. (5,10-methylene-3-(N,N-diethylamino)-19-nor-Δ¹,³-pregnadiene-17α,21-diol-20-one 21-acetate). |
| 5,10-methylene-19-nor-Δ¹-pregnen-17α-ol-3,20-dione. | Methylamine. | 3(N-methylamino)-5,10-seco-5,19-cyclo-Δ¹(10),2,4-pregnatrien-17α-ol-20-one. (5,10-methylene-3(N-methylamino)-19-nor-Δ¹,³-pregnadien-17α-ol-20-one). |
| 5,10-methylene-19-nor-Δ¹-pregnen-17α-ol-3,20-dione acetate. | Aniline. | 3(N-anilino)-5,10-seco-5,19-cyclo-Δ¹(10),2,4-pregnatrien-17α-ol-20-one acetate. (5,10-methylene-3(N-anilino)-19-nor-Δ¹,³-pregnadien-17α-ol-20-one acetate). |

Example XII

By following the method described in Example 2, the compound below mentioned (I) were treated with pyrrolidine to produce the compounds listed under (II).

| I | II |
|---|----|
| 5,10-methylene-19-nor-Δ¹-pregnene-3,20-dione. | 3(N-pyrrolidyl)-5,10-seco-5,19-cyclo-Δ¹(10),2,4-pregnatrien-20-one. (5,10-methylene-3(N-pyrrolidyl)-19-nor-Δ¹,³-pregnadien-20-one). |
| 5,10-methylene-17α-methyl-19-nor-Δ¹-androsten-17β-ol-3-one. | 3(N-pyrrolidyl)-17α-methyl-5,10-seco-5,19-cyclo-Δ¹(10),2,4-androstatrien-17β-ol. (5,10-methylene-3(N-pyrrolidyl)-17α-methyl-19-nor-Δ¹,³-androstadien-17β-ol). |
| 5,10-methylene-17α-vinyl-19-nor-Δ¹-androsten-17β-ol-3-one. | 3(N-pyrrolidyl)-17α-vinyl-5,10-seco-5,19-cyclo-Δ¹(10),2,4-androstatrien-17β-ol. (5,10-methylene-3(N-pyrrolidyl)-17α-vinyl-19-nor-Δ¹,³-androstadien-17β-ol). |
| 5,10-methylene-16β-methyl-19-nor-Δ¹-pregnene-3,20-dione. | 3(N-pyrrolidyl)-16β-methyl-5,10-seco-5,19-cyclo-Δ¹(10),2,4-pregnatrien-20-one-5,10-methylene-3(N-pyrrolidyl) 16β-methyl-19-nor-Δ¹,³-pregnadien-20-one). |
| 5,10-methylene-19-nor-Δ¹-pregnene-17α,21-diol-3,20-dione 21-acetate. | 3(N-pyrrolidyl)-5,10-seco-5,19-cyclo-Δ¹(10),2,4-pregnatriene-17α,21-diol-20-one 21-acetate. (5,10-methylene-3(N-pyrrolidyl)-19-nor-Δ¹,³-pregnadiene-17α,21-diol-20-one 21-acetate). |
| 5,10-methylene-19-nor-Δ¹-pregnene-17α,21-diol-3,11,20-trione-21-acetate. | 3(N-pyrrolidyl)-5,10-seco-5,19-cylo-Δ¹(10),2,4-pregnatriene-17α,21-diol-11,20-dione 21-acetate. (5,10-methylene-3(N-pyrrolidyl)-19-nor-Δ¹,³-pregnadiene-17α,21-diol-11,20-dione 21-acetate). |
| 5,10-methylene-16α-methyl-19-nor-Δ¹-pregnene-17α,21-diol-3,11,20-trione 21-acetate. | 3(N-pyrrolidyl)-16α-methyl-5,10-seco-5,19-cyclo-Δ¹(10),2,4-pregnatriene-17α,21-diol-11,20-dione 21-acetate. (5,10-methylene-3(N-pyrrolidyl)-16α-methyl-19-nor-Δ¹,³-pregnadiene-17α,21-diol-11,20-dione 21-acetate). |
| 5,10-methylen-16α,17α-isopropylidenedioxy-19-nor-Δ¹-pregnen-21-ol-3,11,20-trione acetate. | 3(N-pyrrolidyl)-16α,17α-isopropylidenedioxy-5,10-seco-5,19-cyclo-Δ¹(10),2,4-pregnatrien-21-ol-11,20-dione acetate. (5,10-methylene-3(N-pyrrolidyl)-16α,17α-isopropylidenedioxy-19-nor-Δ¹,³-pregnadien-21-ol-11,20-dione acetate). |
| 9α-fluoro-5,10-methylene-19-nor-Δ¹-pregnene-11β,17α,21-triol-3,20-dione 21-acetate. | 3(N-pyrrolidyl)-9α-fluoro-5,10-seco-5,19-cyclo-Δ¹(10),2,4-pregnatriene-11β,17α,21-triol-20-one 21-acetate. (5,10-methylene-3(N-pyrrolidyl)-9α-fluoro-19-nor-Δ¹,³-pregnadiene-11β,17α,21-triol-20-one 21-acetate). |
| 9α-fluoro-5,10-methylene-16α-methyl-19-nor-Δ¹-pregnene-11β,17α,21-triol-3,20-dione 21-acetate. | 3(N-pyrrolidyl)-9α-fluoro-16α-methyl-5,10-seco-5,19-cyclo-Δ¹(10),2,4-pregnatriene-11β,17α,21-triol-20-one 21-acetate. (5,10-methylene-3(N-pyrrolidyl)-9α-fluoro-16α-methyl-19-nor-Δ¹,³-pregnadiene-11β,17α,21-triol-20-one 21-acetate). |
| 9α-chloro-5,10-methylene-16α-methyl-19-nor-Δ¹-pregnene-17α,21-diol-3,11,20-trione 21-acetate. | 3(N-pyrrolidyl)-9α-chloro-16α-methyl-5,10-seco-5,19-cyclo-Δ¹(10),2,4-pregnatriene-17α-21-diol-11,20-dione 21-acetate. (5,10-methylene-3(N-pyrrolidyl)-9α-chloro-16α-methyl-19-nor-Δ¹,³-pregnadiene-17α,21-diol-11,20-dione 21-acetate). |

Example XIII

By following the method described in Example II but using piperidine instead of pyrrolidine, 5,10-methylene-19-nor-Δ¹-pregnen-17α-ol-3,20-dione, 5,10-methylene-19-nor - Δ¹ - pregnene - 17α,21 - diol-3,11,20-trione and 5,10-methylene - 17α - ethinyl - 19 - nor-Δ¹-androsten-17β-ol-3-one were converted into the 3(N-piperidyl) compounds, i.e. 3(N-piperidyl)-5,10-seco-5,19-cyclo-Δ¹(10),2,4-pregnatrien-17α-ol-20-one (5,10-methylene-3-(N-piperidyl)-19-nor-Δ¹,³-pregnadien-17α-ol-20-one), 3(N-piperidyl)-5,10-seco - 5,19 - cyclo - Δ¹(10),2,4 - pregnatriene - 17α,21 - diol-11,20-dione (5,10-methylene-3(N-piperidyl)-19-nor-Δ¹,³-pregnadiene-17α,21-diol-11,20-dione) and 3(N-piperidyl)-17α-ethinyl-5,10-seco - 5,19 - cyclo-Δ¹(10),2,4-androstatrien-17β-ol (5,10-methylene-3(N-piperidyl) - 17α - ethinyl-19-nor-Δ¹,³-androstadien-17β-ol).

Example XIV

In the method of Example III benzene was substituted by toluene, to produce also 3(N,N-diethylamino)-5,10-seco-5,19-cyclo-Δ$^{1(10),2,4}$-androstatrien-17β-ol (5,10-methylene-3(N,N-diethylamino)-19-nor-Δ$^{1,3}$-androstadien-17β-ol) in similar yield.

Example XV

Example III was repeated but using dioxane as solvent, to produce the same product in similar yield.

Example XVI

A solution of 1 g. of 3(N-methylanilino)15,10-seco-5,19-cyclo-Δ$^{1(10),2,4}$-pregnatriene-17α,21-diol-11,20-dione 21-acetate (5,10-methylene-3(N-methylanilino)-19-nor-Δ$^{1,3}$-pregnadiene-17α,21-diol-11,20-dione 21-acetate) in 50 cc. of methanol was treated with 5 cc. of an aqueous 4% potassium hydroxide solution; the reaction mixture was stirred at 0° C. for 1 hour under nitrogen atmosphere, the mixture was neutralized with acetic acid and the methanol was distilled under reduced pressure. The residue was triturated with water, the solid was filtered off, washed with water, dried and recrystallized from ethyl acetate-methanol, thus producing 3(N-methylanilino)-5,10-seco-5,19-cyclo-Δ$^{1(10),2,4}$-pregnatriene-17α,21-diol-11,20-dione (5,10-methylene-3(N-methylanilino)-19-nor-Δ$^{1,3}$-pregnadiene-17α,21-diol-11,20-dione).

In the same manner 3(N-methyl, N-ethylamino)-9α-fluoro-5,10-seco-5,19-cyclo-Δ$^{1(10),2,4}$-pregnatriene-11β,17α,21-triol-20-one 21-acetate (9α-fluoro-5,10-methylene-3(N-methyl, N-ethylamino)-19-nor-Δ$^{1,3}$-pregnadiene-11β,17α,21-triol-20-one 21-acetate), 3(N-pyrrolidyl)-5,10-seco-5,19-cyclo-Δ$^{1(10),2,4}$-pregnatriene-17α,21-diol-20-one 21-acetate (5,10-methylene-3(N-pyrrolidyl)-19-nor-Δ$^{1,3}$-pregnadiene-17α,21-diol-20-one 21-acetate) and 3(N-pyrrolidyl)-16α,17α-isopropylidenedioxy-5,10-seco-5,19-cyclo-Δ$^{1(10),2,4}$-pregnatrien-21-ol-11,20-dione acetate (5,10-methylene-3(N-pyrrolidyl)-16α,17α-isopropylidenedioxy 19-nor-Δ$^{1,3}$-pregnadien-21-ol-11,20-dione acetate), were converted into the corresponding free compounds.

Example XVII

A mixture of 1 g. of 3(N-methylanilino)-5,10-seco-5,19-cycloΔ$^{1(10),2,4}$-pregnatrien-17α,21-diol-11,20-dione (5,10-methylene-3(N-methylanilino)-19-nor-Δ$^{1,3}$-pregnadiene-17α,21-diol-11,20-dione), 4 cc. of pyridine and 2 cc. of propionic anhydride was kept at room temperature overnight, poured into ice water, the formed precipitate collected by filtration, washed with water and dried. Crystallization from acetone-hexane gave the 21-propionate of 3(N-methylanilino)-5,10-seco-5,19-cyclo-Δ$^{1(10),2,4}$-pregnatrien-17α,21-diol-11,20-dione (21-propionate of 5,10-methylene-3(N-methylanilino-19-nor-Δ$^{1,3}$-pregnadiene-17α,21-diol-11,20-dione).

By the same method the free compounds obtained in the preceding example were esterified with propionic, caproic, enanthic and cyclopropionic anhydride, thus yielding the respective esters.

Example XVIII

A mixture of 1 g. of the acetate of 5,10-methylene 19-Δ$^1$-androsten-17β-ol-3-one, 20 cc. of propionic anhydride and 100 mg. of p-toluenesulfonic acid was refluxed for 1 hour, it was poured into sodium carbonate solution and stirred for 30 minutes to hydrolyze the excess anhydride. It was extracted with methylene chloride and the extract washed with water to neutral, dried and evaporated to dryness, to produce 3-propionoxy-17-acetoxy-5,10-seco-5,19-cyclo-Δ$^{1(10),2,4}$-androstatriene (5,10-methylene-3-propionoxy-17-acetoxy-19-nor-Δ$^{1,3}$-androstadiene).

By the same method, starting from 5,10-methylene-17α-methyl-19-nor-Δ$^1$-androsten-17β-ol-3-one there was obtained 3,17β-dipropionoxy-17α-methyl-5,10-seco-5,19-cycloΔ$^{1(10),2,4}$-androstatriene (5-10-methylene-17α-methyl-3,17β-dipropionoxy-19-nor-Δ$^{1,3}$-androstadiene).

I claim:

1. A compound selected from the group consisting of compounds represented by the formula:

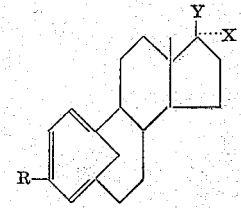

and compounds represented by the formula:

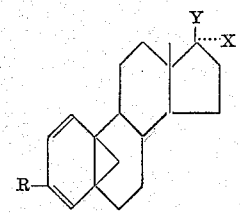

wherein R is selected from the group consisting of —OR$^4$ and

R$^4$ being selected from the group consisting of a lower alkyl group and an acyl group containing up to 12 carbon atoms, R$^5$ being selected from the group consisting of a lower alkyl group, a monocyclic aryl group and a monocyclic aralkyl group, and R$^6$ being selected from the group consisting of hydrogen, a lower alkyl group, an aryl group containing up to 8 carbon atoms and an aralkyl group containing up to 8 carbon atoms, with R$^5$ and R$^6$ taken together, along with the nitrogen atom to which they are attached, being a heterocyclic group selected from the group consisting of piperidino, pyrollidino, morpholino and piperazino; X is selected from the group consisting of hydrogen, a lower alkyl group, a lower alkenyl group and a lower alkinyl group, and Y is selected from the group consisting of hydroxyl and an acyloxy group containing up to 12 carbon atoms; with X and Y taken together being a keto group.

2. 3-methoxy-5,10-seco-5,19-cyclo-Δ$^{1(10),2,4}$-androstatrien-17-one.

3. 3-methoxy-5,10-methylene-19-nor-Δ$^{1,3}$-androstadien-17-one.

4. 3,17-diacetoxy-5,10-seco-5,19-cyclo-Δ$^{1(10),2,4}$-androstatriene.

5. 3,17-diacetoxy-5,10-methylene-19-nor-Δ$^{1,3}$-androstadiene.

6. 3(N-pyrrolidyl)-5,10-seco-5,19-cyclo-Δ$^{1(10),2,4}$-androstatrien-17-one.

7. 5,10-methylene-3(N-pyrrolidyl)-19-nor-Δ$^{1,3}$-androstadien-17-one.

8. 3(N-pyrrolidyl)-5,10-seco-5,19-cyclo-Δ$^{1(10),2,4}$-androstatrien-17β-ol.

9. 5,10-methylene-3(N-pyrrolidyl)-19-nor-Δ$^{1,3}$-androstadien-17β-ol.

10. 3(N,N-dimethylamino)-5,10-seco-5,19-cyclo-Δ$^{1(10),2,4}$-androstatrien-17β-ol.

11. 5,10-methylene-3(N,N-dimethylamino)-19-nor-Δ$^{1,3}$-androstadien-17β-ol.

12. A compound selected from the group consisting of compounds represented by the formula:

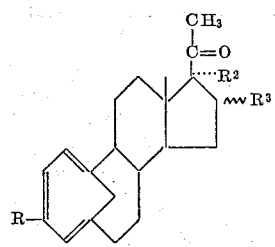

and compounds represented by the formula:

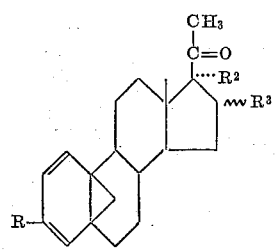

wherein R is selected from the group consisting of —OR$^4$ and

R$^4$ being selected from the group consisting of a lower alkyl group and an acyl group containing up to 12 carbon atoms, R$^5$ being selected from the group consisting of a lower alkyl group, a monocyclic aryl group and a monocyclic aralkyl group, and R$^6$ being selected from the group consisting of hydrogen, a lower alkyl group, an aryl group containing up to 8 carbon atoms and an aralkyl group containing up to 8 carbon atoms, with R$^5$ and R$^6$ taken together, along with the nitrogen atom to which they are attached, being a heterocyclic group selected from the group consisting of piperidino, pyrollidino, morpholino and piperazino; and R$^2$ is selected from the group consisting of hydrogen, hydroxyl and an acyloxy group containing up to 12 carbon atoms, and R$^3$ is selected from the group consisting of hydrogen, α-methyl, β-methyl and β-hydroxyl, with R$^2$ and R$^3$ taken together being

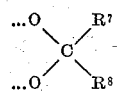

wherein R$^7$ is selected from the group consisting of hydrogen and a lower alkyl group and R$^8$ is selected from the group consisting of hydrogen, a lower alkyl group, a monocyclic aryl group and a monocyclic aralkyl group.

13. 3 - methoxy-5,10-seco-5,19-cyclo-Δ$^{1(10),2,4}$-pregnatrien-20-one.

14. 3 - acetoxy-5,10-seco-5,19-cyclo-Δ$^{1(10),2,4}$-pregnatrien-20-one.

15. 3(N - pyrrolidyl) - 5,10-seco-5,19-cyclo-Δ$^{1(10),2,4}$-pregnatrien-20-one.

16. 3(N - methylamino)-5,10-seco-5,19-cyclo-Δ$^{1(10),2,4}$-pregnatrien-17α-ol-20-one.

17. A compound selected from the group consisting of compounds represented by the formula:

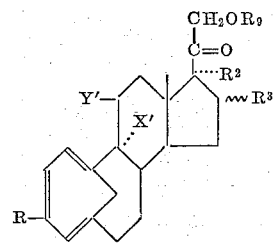

and compounds represented by the formula:

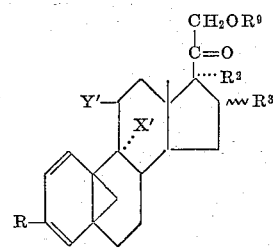

wherein R is selected from the group consisting of —OR$^4$ and

R$^4$ being selected from the group consisting of a lower alkyl group and an acyl group containing up to 12 carbon atoms, R$^5$ being selected from the group consisting of a lower alkyl group, a monocyclic aryl group and a monocyclic aralkyl group, and R$^6$ being selected from the group consisting of hydrogen, a lower alkyl group, an aryl group containing up to 8 carbon atoms and an aralkyl group containing up to 8 carbon atoms, with R$^5$ and R$^6$ taken together, along with the nitrogen atom to which they are attached, being a heterocyclic group selected from the group consisting of piperidino, pyrollidino, morpholino and piperazino; R$^2$ is selected from the group consisting of hydrogen, hydroxyl and an acyloxy group containing up to 12 carbon atoms; R$^3$ is selected from the group consisting of hydrogen, α-methyl, β-methyl and β-hydroxyl, with R$^2$ and R$^3$ taken together being $$\begin{array}{c}...O\diagdown\phantom{C}\diagup R^7\\ \phantom{..}C\\ ...O\diagup\phantom{C}\diagdown R^8\end{array}$$

wherein R$^7$ is selected from the group consisting of hydrogen and a lower alkyl group and R$^8$ is selected from the group consisting of hydrogen, a lower alkyl group, a monocyclic aryl group and a monocyclic aralkyl group; R$^9$ is selected from the group consisting of hydrogen and an acyl group containing up to 12 carbon atoms; X$^1$ is selected from the group consisting of hydrogen and a halogen, and Y$^1$ is selected from the group consisting of hydrogen, β-hydroxyl and a keto group, with X$^1$ being hydrogen when Y$^1$ is hydrogen.

18. 3 - methoxy-5,10-seco-5,19-cyclo-Δ$^{1(10),2,4}$-pregnatriene-11β,17α,21-triol-20-one.

19. 3(N - pyrrolidyl) - 5,10-seco-5,19-cyclo-Δ$^{1(10),2,4}$-pregnatriene-17α,21-diol-11,20-dione 21-acetate.

20. 3(N - methyl-N-ethylamino)-9α-fluoro-5,10-seco-5,19 - cyclo-Δ$^{1(10),2,4}$-pregnatriene-11β,17α,21-triol-20-one 21-acetate.

21. 3(N - piperidyl)-5,10-seco-5,19-cyclo-Δ$^{1(10),2,4}$-pregnatriene-17α,21-diol-11,20-dione.

22. 3(N - pyrrolidyl)-16α,17α-isopropylidenedioxy-5,10-seco-5,19-cyclo-Δ$^{1(10),2,4}$-pregnatrien-21-ol-11,20-dione.

No references cited.

LEWIS GOTTS, *Primary Examiner.*